US012697663B2

(12) United States Patent　　　　　(10) Patent No.:　US 12,697,663 B2

Salazar Tello　　　　　　　　　　　　　(45) Date of Patent:　　　　Aug. 4, 2026

(54) MANDREL ASSEMBLY FOR USE WITH A ROTARY TOOL

(71) Applicant: Robert Bosch GmbH, Stuttgart (DE)

(72) Inventor: Andres David Salazar Tello, Mexicali (MX)

(73) Assignee: Robert Bosch GmbH, Stuttgart (DE)

( * ) Notice: Subject to any disclaimer, the term of this patent is extended or adjusted under 35 U.S.C. 154(b) by 557 days.

(21) Appl. No.: 18/196,716

(22) Filed: May 12, 2023

(65) Prior Publication Data

US 2024/0375187 A1　　Nov. 14, 2024

(51) Int. Cl.
B23B 31/40　　　　(2006.01)
B24B 45/00　　　　(2006.01)

(52) U.S. Cl.
CPC ............ B23B 31/40 (2013.01); B24B 45/006 (2013.01)

(58) Field of Classification Search
CPC ..... B23B 31/40; B23B 31/4073; B23B 31/10; B23B 31/107; B23B 31/1079; B23B 31/117; B23B 31/1173; B24B 45/006; B27B 5/32
USPC ................................. 279/2.1, 2.22
See application file for complete search history.

(56) References Cited

U.S. PATENT DOCUMENTS

| 1,941,840 | A | | 1/1934 | Kelsey |
| 3,912,411 | A | * | 10/1975 | Moffat ..................... B24D 7/16 |
| | | | | 403/259 |

| 4,561,217 | A | | 12/1985 | Steyskal |
| 4,657,428 | A | | 4/1987 | Wiley |
| 4,730,952 | A | | 3/1988 | Wiley |
| 7,387,563 | B2 | | 6/2008 | Allemann et al. |
| 7,484,736 | B2 | | 2/2009 | Allemann et al. |
| 7,614,940 | B2 | | 11/2009 | Jerome et al. |
| 8,096,855 | B2 | | 1/2012 | Jermone et al. |
| 8,167,689 | B2 | * | 5/2012 | Hofmann ................. B24D 7/16 |
| | | | | 451/359 |
| 9,687,917 | B2 | | 6/2017 | Pamatmat |
| 9,694,472 | B2 | * | 7/2017 | Luescher .............. B24B 45/006 |
| 9,751,135 | B1 | | 9/2017 | Terris |
| 10,471,518 | B2 | | 11/2019 | Klabunde et al. |
| 10,525,560 | B2 | | 1/2020 | Haimer |
| 10,828,742 | B2 | * | 11/2020 | Luescher .............. B24B 23/022 |

(Continued)

FOREIGN PATENT DOCUMENTS

| CN | 102069482 | 6/2013 |
| CN | 214351701 | 10/2021 |

(Continued)

OTHER PUBLICATIONS

PCT International Search Report for PCT/EP2024/061947.

*Primary Examiner* — Nicole N Ramos

(74) *Attorney, Agent, or Firm* — Maginot, Moore & Beck LLP

(57) ABSTRACT

A mandrel assembly may be used with a rotary power tool to provide a reliable and stable connection between the rotary tool and a tool accessory. The mandrel assembly provides a quick-connect/quick-release connection between the tool output shaft and the accessory via a clamping action. In particular, the mandrel assembly is operable to clamp the accessory between elastic clamping jaws that protrude from one end of the mandrel and a collar which surrounds the mandrel and is spring-biased toward the mandrel end.

20 Claims, 6 Drawing Sheets

(56) References Cited

U.S. PATENT DOCUMENTS

| 2007/0018413 | A1* | 1/2007 | Allemann | B24D 5/16 |
| | | | | 279/143 |
| 2007/0021044 | A1* | 1/2007 | Allemann | A61C 3/06 |
| | | | | 451/342 |
| 2007/0248429 | A1* | 10/2007 | Jerome | B24B 45/00 |
| | | | | 409/234 |
| 2007/0272064 | A1* | 11/2007 | Kraenzler | B24B 45/006 |
| | | | | 82/160 |
| 2014/0182873 | A1* | 7/2014 | Fankhauser | B27B 19/006 |
| | | | | 279/141 |
| 2015/0075830 | A1* | 3/2015 | Zhang | B24B 23/022 |
| | | | | 173/213 |
| 2016/0052063 | A1* | 2/2016 | Englund | B23B 31/4033 |
| | | | | 279/2.1 |
| 2016/0199919 | A1* | 7/2016 | Klabunde | B24B 45/006 |
| | | | | 279/141 |
| 2020/0039026 | A1 | 2/2020 | Luescher et al. | |
| 2020/0094373 | A1 | 3/2020 | Leuscher et al. | |
| 2020/0164485 | A1* | 5/2020 | Sinzig | B24B 23/022 |
| 2020/0306902 | A1 | 10/2020 | Hofmann | |
| 2021/0053176 | A1* | 2/2021 | Di Nicolantonio | B24B 23/022 |
| 2021/0162512 | A1 | 6/2021 | Okada | |

FOREIGN PATENT DOCUMENTS

| CN | 113319606 | 11/2021 |
| DE | 102011003103 | 7/2012 |
| DE | 102020110218 | 3/2022 |
| WO | 1998043779 | 10/1998 |
| WO | 2019030058 | 2/2019 |

* cited by examiner

MANDREL ASSEMBLY FOR USE WITH A ROTARY TOOL

BACKGROUND

Hand held rotary tools typically include a tool housing designed to be easily held within a human hand. The housing contains an electric motor which is operable to drive a rotatable chuck of the rotary tool. A mandrel may be releasably coupled to the chuck so as to be rotatably driven by the rotary tool. In turn, an accessory may be releasably secured to the mandrel thereby enabling the rotary tool to rotatably drive the accessory. The accessory may be a cutting blade, a cut-off wheel, a polishing wheel, a grinding wheel, a sanding disc, or any other similar device.

Many types of mechanisms may be used to secure the accessory to the mandrel. In one example, a mandrel includes a base having a threaded aperture and a clamping screw that engages the aperture in order to clamp the accessory between the base and the clamping screw. In this example, a tool is required to tighten the clamping screw. In another example, an accessory is connected to the mandrel via a quick connection clamp that is operated via a lever provided on the tool for that purpose. In this example, the lever mechanism adds weight, complexity and cost to the tool. In both examples, with the accessory so clamped, rotation of the mandrel by the rotary tool causes rotation of the accessory thereby allowing the user to perform work on a workpiece.

Accordingly, it would be advantageous to provide a mandrel that can be used quickly and easily and does not require the use of an additional tool such as a screwdriver, or the use of a relatively small, separate component such as a clamping screw. In addition, it would be advantageous to provide a mandrel having a simple and easily operated mechanism.

SUMMARY

A mandrel assembly is disclosed that may be used with a rotary power tool to provide a reliable and stable connection between the rotary tool and a tool accessory. The mandrel assembly provides a quick-connect/quick-release connection between the tool output shaft and the accessory via a clamping action. In particular, the mandrel assembly is operable to clamp the accessory between clamping jaws that protrude from one end of the mandrel and a collar which surrounds the mandrel and is spring-biased toward the clamping jaws.

The mandrel assembly 4 is manually transformable between a first configuration in which the accessory may be fixed relative to the collar via a clamping force and engagement of the mandrel assembly with the accessory, and a second configuration in which the accessory can be mounted on the collar or detached from the collar. The configuration of the mandrel assembly is changed between the first and second configurations by an axial movement of the collar relative to the mandrel.

In some aspects, a mandrel assembly includes a cylindrical collar, the cylindrical collar including a collar first end, a collar second end that is opposite the first end, and a sidewall that extends between the collar first end and the collar second end. The sidewall includes an inner surface that defines a bore, and the intersection of the bore with the collar first end defines a first collar opening. The intersection of the bore with the collar second end defines a second collar opening, and the bore has a step change in diameter that defines a collar inner shoulder. The mandrel assembly includes a mandrel having a mandrel first end that is disposed in the bore, and a mandrel second end that is opposite the mandrel first end. The mandrel second end protrudes from the collar second end. In addition, the mandrel includes a mandrel longitudinal axis that extends through the mandrel first end and the mandrel second end. The mandrel assembly includes a guide. The guide includes a body portion that is disposed in the bore and secured to the mandrel first end. In addition, the guide includes a first post and a second post that protrude from the body portion in a direction parallel to the mandrel longitudinal axis. The first post is disposed on a side of the mandrel longitudinal axis that is diametrically opposed to the second post. The mandrel assembly includes an outer elastic member that extends between the mandrel first end and the collar inner shoulder and biases the collar first end away from the mandrel second end. In addition, the mandrel assembly includes an inner elastic member having a base that is disposed between the first post and the second post and is fixed to the mandrel first end, and a spring arm that protrudes from the base and extends through the first collar opening. The spring arm is configured to elastically deflect relative to the base in a direction perpendicular to the mandrel longitudinal axis.

In some embodiments, the spring arm is configured to elastically deflect between a first position and a second position, and the second position is closer to the mandrel longitudinal axis than the first position.

In some embodiments, an amount of deflection of the spring arm is determined by an axial position of the collar relative to the mandrel.

In some embodiments, the spring arm includes a proximal end that adjoins the base and distal end that is opposite the proximal end, and the distal end is shaped and dimensioned to provide a clamping jaw.

In some embodiments, the base of the inner elastic member includes a first surface that faces the mandrel, a second surface that faces away from the mandrel, a central opening that extends between the first surface and the second surface and defines an inner peripheral surface, and teeth that protrude inward from the inner peripheral surface and are acutely angled relative to the second surface.

In some embodiments, the teeth are configured to engage a protrusion of the mandrel.

In some embodiments, the spring arm protrudes from the second surface so as to be acutely angled relative to the second surface.

In some embodiments, the base plate comprises a central opening configured to engage a portion of the mandrel.

In some embodiments, when the collar is in a first axial position relative to the mandrel, the spring arm is at a first angle relative to the base, and the distance between the collar first end and the mandrel first end is a first axial distance. When the collar is in a second axial position relative to the mandrel, the spring arm is at a second angle relative to the base, and the distance between the collar first end and the mandrel first end is a second axial distance. The second angle is less than the first angle, and the second axial distance is less than the first axial distance.

In some embodiments, the spring arm comprises a first spring arm and a second spring arm, the first spring arm and the second spring arm each include a proximal end that is fixed to the base plate and a distal end that is spaced apart from the proximal end, and the distal end of each of the first spring arm and the second spring arm has a triangular profile that defines a cam surface and a clamping surface that is angled relative to the cam surface.

In some embodiments, the cam surface of the first spring arm faces away from the cam surface of the second spring arm.

In some embodiments, the clamping surfaces of the first spring arm and the second spring arm face an outer surface of the collar.

In some embodiments, the spring arm comprises a first spring arm and a second spring arm, and the first spring arm and the second spring arm each include a proximal end that is fixed to the base plate and a distal end that is spaced apart from the proximal end. The proximal end of the first spring arm is spaced apart from the proximal end of the second spring arm, and the first spring arm and the second spring arm each protrude from the base at a first angle such that distance between the respective distal ends of the first and second spring arms is smaller than the distance between the respective proximal ends of the first and second spring arms when the inner elastic member is in an unloaded state.

In some embodiments, when the collar is in a first axial position relative to the mandrel, the first spring arm and the second spring arm are at the first angle relative to the base, and the distance between the collar first end and the mandrel first end is a first axial distance. When the collar is in a second axial position relative to the mandrel, a protrusion of the collar engages the first spring arm and the second spring arm and causes the first spring arm and the second spring arm to deflect such that the first spring arm and the second spring arm are at a second angle relative to the base, and the distance between the collar first end and the mandrel first end is a second axial distance. The second angle is less than the first angle, and the second axial distance is less than the first axial distance.

In some embodiments, the first collar opening comprises a guide tooth that protrudes radially with respect to the mandrel longitudinal axis. An outer surface of the post comprises an axially-extending guide slot and the guide tooth is disposed in the guide slot. The guide tooth is shaped and dimensioned to be received in the guide slot in a sliding fit.

In some embodiments, the first collar opening comprises a deflection tooth that protrudes radially with respect to the mandrel longitudinal axis. The deflection tooth is configured to engage the spring arm in certain axial positions of the collar with respect to the mandrel.

In some embodiments, the first collar opening comprises a guide tooth that protrudes radially with respect to the mandrel longitudinal axis. The guide tooth is configured to engage with a guide slot of the guide. In addition, the first collar opening comprises a pair of deflection teeth that protrude radially with respect to the mandrel longitudinal axis. The guide tooth is disposed between, and spaced apart from, each of the deflection teeth along a circumference of the first collar opening.

In some embodiments, a radial dimension of the guide tooth is different than a radial dimension of each of the pair of deflection teeth.

In some embodiments, the spring arm includes a first spring arm and a second spring arm. The first spring arm and the second spring arm each include a proximal end that is fixed to the base plate and a distal end that is spaced apart from the proximal end. When the collar is in a first axial position relative to the mandrel, the first spring arm and the second spring arm are at a first angle relative to the base. When the collar is in a second axial position relative to the mandrel, the first spring arm and the second spring arm are at a second angle relative to the base, and the second angle is less than the first angle.

In some embodiments, the first collar opening includes a first deflection tooth and a second deflection tooth that protrude radially with respect to the mandrel longitudinal axis and are disposed on opposed sides of the mandrel longitudinal axis. When the collar is in the first axial position relative to the mandrel, the first deflection tooth is not engaged with the first spring arm and the second deflection tooth is not engaged with the second spring arm. When the collar is in the second axial position relative to the mandrel, the first deflection tooth abuts and deflects the first spring arm and the second deflection tooth abuts and deflects the second spring arm whereby the first spring arm and the second spring arm are at the second angle relative to the base.

BRIEF DESCRIPTIONS OF THE DRAWINGS

DESCRIPTION

Figures 1, 2, 3:
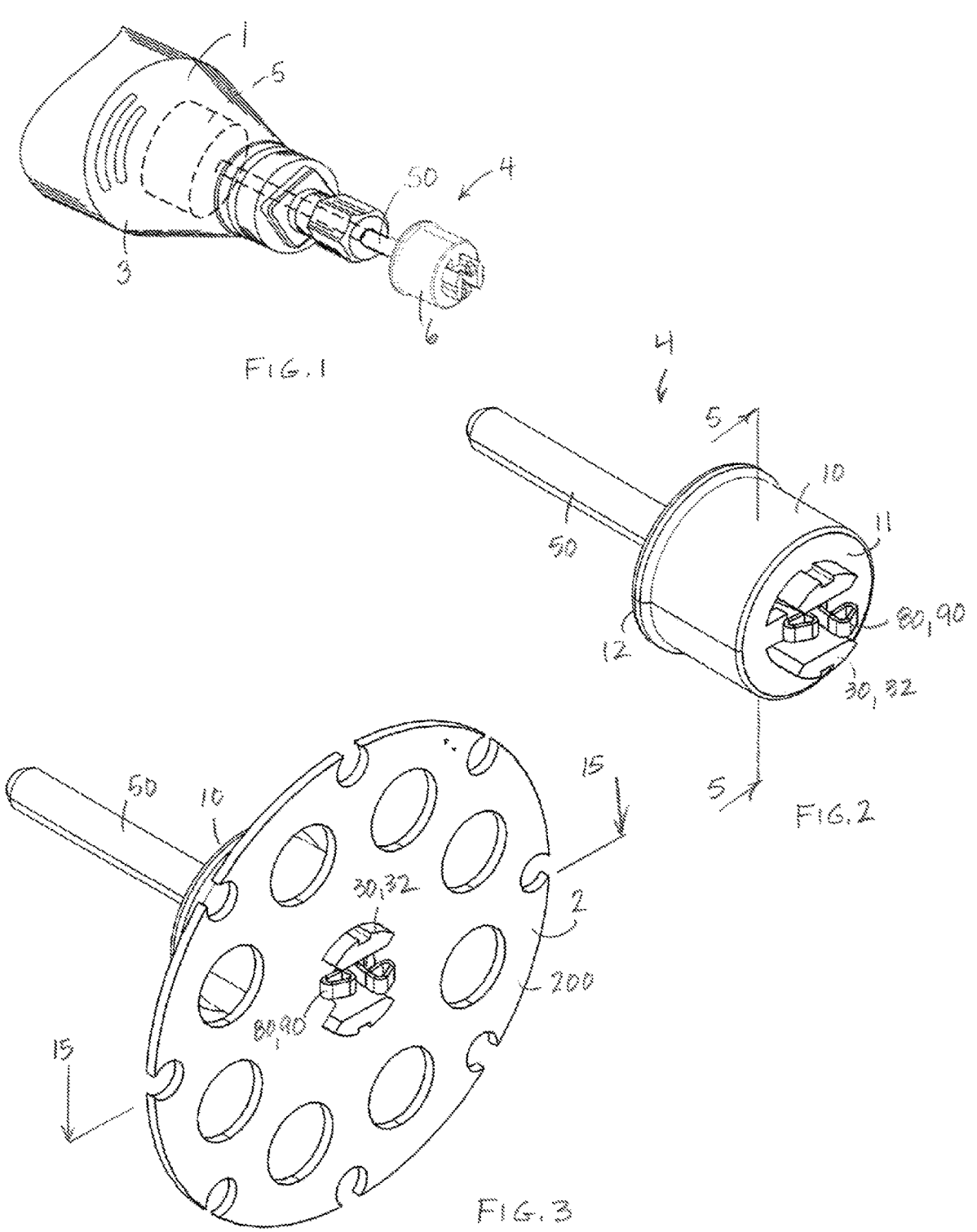
FIG. 1 is a perspective view of a mandrel assembly connected to the chuck of a rotary tool.
FIG. 2 is a perspective view of the mandrel assembly.
FIG. 3 is a perspective view of the mandrel assembly showing an accessory attached thereto.

Referring to FIGS. 1-3, a mandrel assembly 4 may be used with a rotary tool 1 to provide a reliable and stable connection between the rotary tool 1 and a tool accessory 2. In the illustrated embodiment, the rotary tool 1 is a hand-held device having a tool housing 3 designed to be easily held within a human hand. The rotary tool 1 includes an electric motor 5. An output shaft of the motor 5 terminates in a chuck 6 configured to be coupled to a mandrel 50 of the mandrel assembly 4. The tool accessory 2 such as a cut-off wheel 200 is configured to be releasably connected to the mandrel assembly 4 via a quick-release clamping action, as discussed in detail below. Operation of the rotary tool 1 rotates the chuck 6, which in turn rotates the mandrel assembly 4, thereby imparting rotary movement to the cut-off wheel 200.

Figure 4:
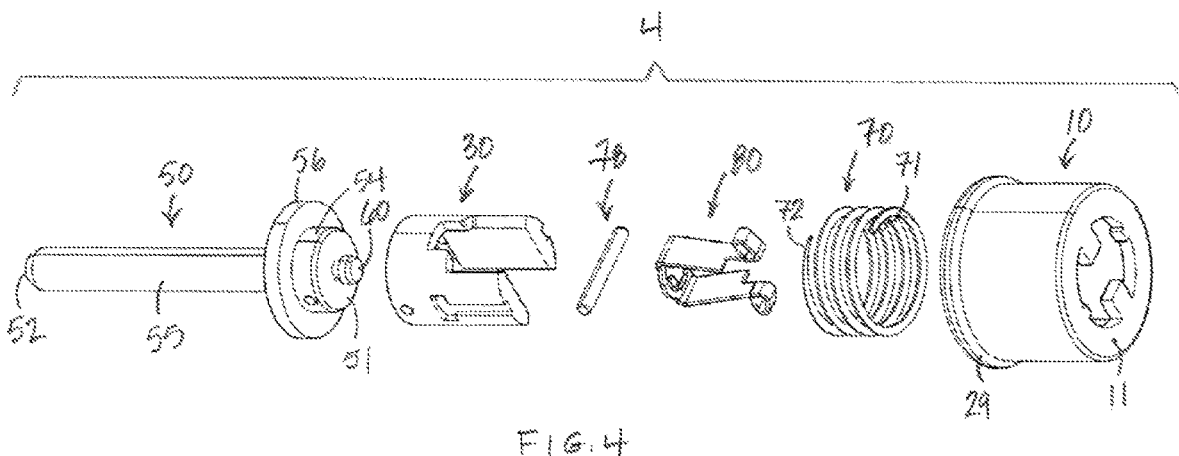
FIG. 4 is an exploded view of the mandrel assembly.
Figure 5:
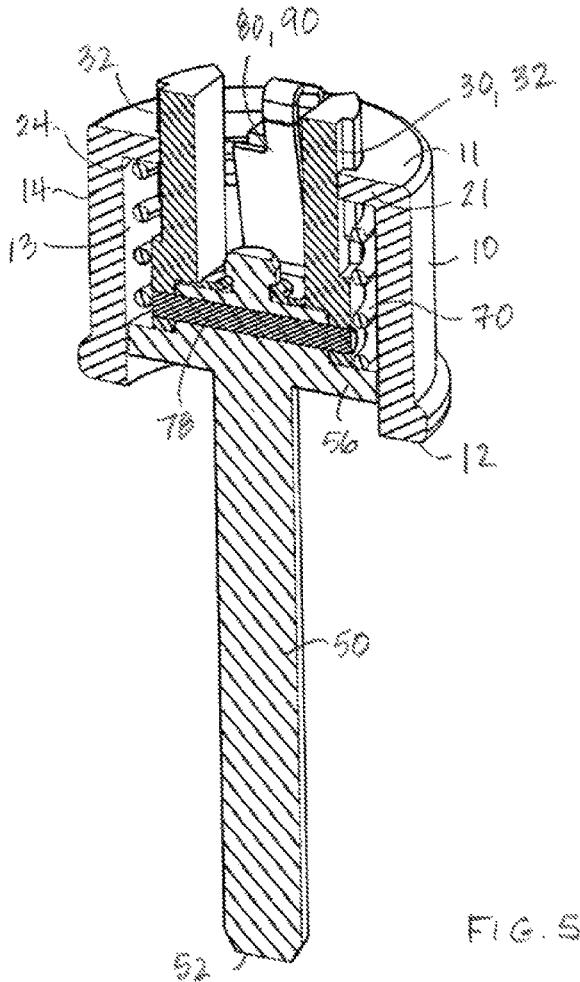
FIG. 5 is a cross-sectional perspective view of the mandrel assembly as seen along line 5-5 of FIG. 2.
Figures 6, 7, 8, 9:
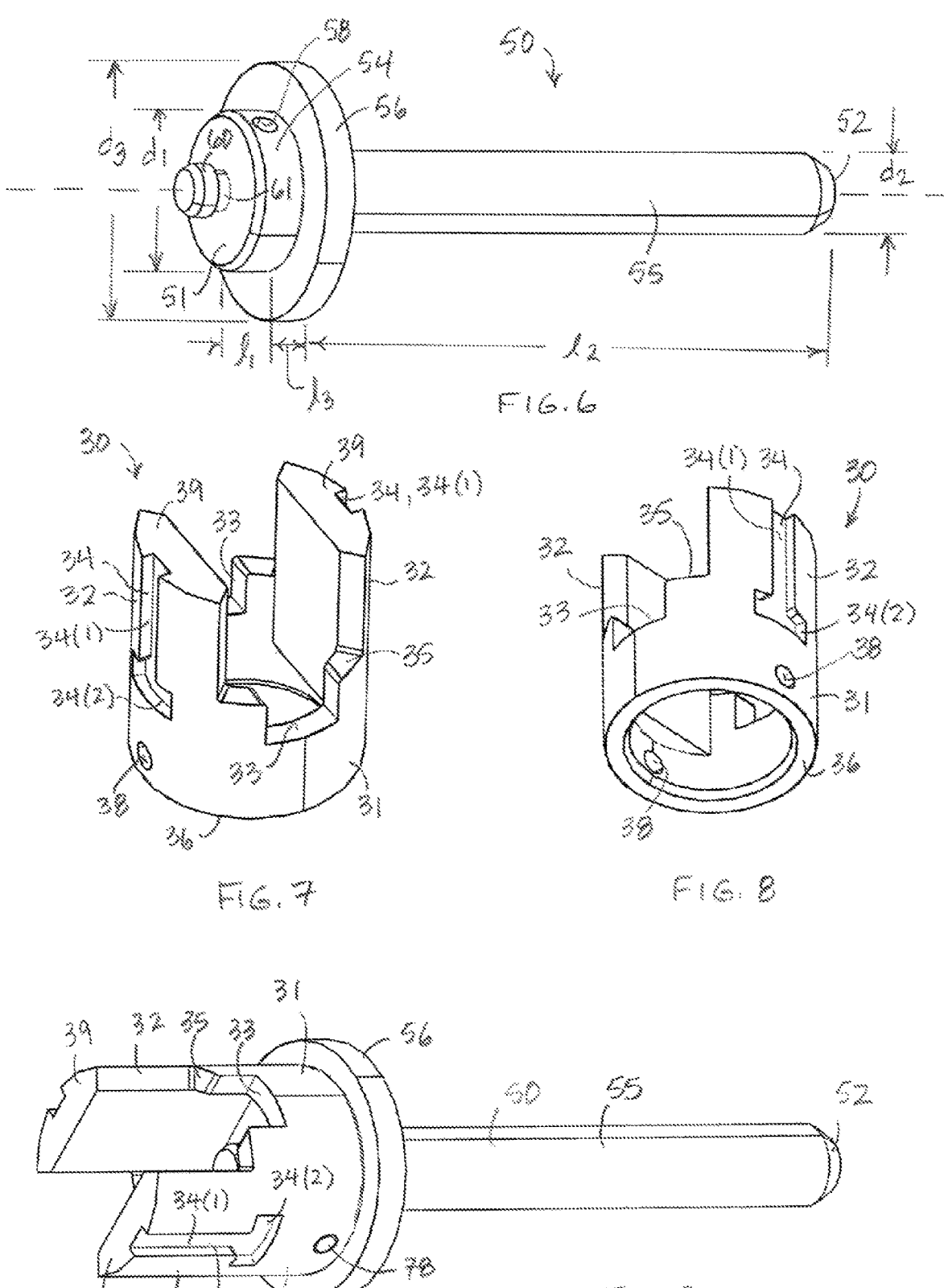
FIG. 6 is a perspective view of the mandrel.
FIG. 7 is a top perspective view of the guide.
FIG. 8 is a bottom perspective view of the guide.
FIG. 9 is a perspective view of the guide secured to the mandrel with the pin.

Referring to FIGS. 4 and 5, the mandrel assembly 4 includes the mandrel 50 and a collar 10 having a bore 16 that receives a first end 51 of the mandrel 50. The mandrel assembly 4 includes a guide 30 disposed on the mandrel first end 51, the guide 30 configured to guide movement of the collar 10 relative to the mandrel 50. In addition, the mandrel assembly 4 includes outer and inner elastic members 70, 80 disposed in the bore 16. The outer elastic member 70 biases the collar 10 away from the mandrel first end 51 and the inner elastic member 80 provides clamping jaws that secure the accessory 2 to one end of the collar 10. The constituents of the mandrel assembly 4 will now be described in detail.

Referring to FIGS. 6-9, the mandrel 50 is a rigid, elongate and generally rod-shaped structure having a first end 51 and a second end 52 that is opposite the first end 51. The mandrel 50 includes a longitudinal axis 53 that extends through the mandrel first and second ends 51, 52 and corresponds to a rotational axis of the mandrel assembly 4. As used herein, the term "axially" refers to the longitudinal axis 53 or a direction parallel to the longitudinal axis 53 and the term "radially" refers to a direction along a radius that is perpendicular to and intersects the longitudinal axis 53.

The mandrel 50 is cylindrical and has a non-uniform diameter. The regions of differing diameter define a head portion 54, a shank portion 55 and an intermediate portion 56 disposed between the head portion 54 and the shank portion 55. The head portion 54 of the mandrel 50 includes the first end 51 and has a first diameter d1. The shank portion 55 of the mandrel 50 includes the second end 52 and has a second diameter d2 that is less than the first diameter d1. The intermediate portion 56 of the mandrel 50 has a third diameter d3 that is greater than the first and second diameters d1, d2. The axial dimensions ℓ1, ℓ3 of the head portion 54 and intermediate portion 56 are small relative to the axial dimension ℓ2 of the shank portion 55. For example, the axial dimension ℓ2 of the shank portion 55 may be ten to fifteen times the axial dimensions ℓ1, ℓ3 of the head portion 54 or the intermediate portion 56.

By this configuration, the intermediate portion 56 serves as an annular flange that supports the outer elastic member 70 within the bore 16. The diameter d3 of the intermediate portion 56 is set based on an inner diameter of the bore 16 so that the intermediate portion 56 is received in the bore 16 in a sliding fit.

In addition, the head portion 54 protrudes axially relative to one side of the intermediate portion 56 and serves as a brace that is inserted in one end of the guide 30 and supports the guide 30 relative to the mandrel first end 51. To this end, the diameter d1 of the head portion 54 is set based on an inner diameter of the guide 30 so that the head portion 54 is received in the guide 30 in a clearance fit or press fit.

The head portion 54 includes a through-opening 58 that extends in a direction perpendicular to the mandrel longitudinal axis 53 and passes through a longitudinal centerline of the mandrel 50. The through-opening 58 receives a pin 78 that is used to secure the guide 30 to the mandrel first end 51.

The end face 59 of the first end 51 includes an axially-extending protrusion 60. The protrusion 60 is generally ball shaped, whereby a neck 61 is formed at the interface between the protrusion 60 and the end face 59. The neck 61 receives teeth 86 provided on the inner elastic member 80, as discussed in detail below.

Thus, the mandrel head portion 54 and intermediate portion 56 support the outer elastic member 70, the guide 30 and the inner elastic member 80 relative to the collar 10.

The mandrel shank portion 55, including the second end 52, is configured to be received in the chuck 6 of the rotary tool 1. In the illustrated embodiment, the mandrel second end 52 is rounded to facilitate insertion into the chuck 6.

The guide 30 is a hollow, rigid structure having an annular body portion 31 that is disposed in the bore 16 and is secured to the mandrel first end 51. The body portion 31 is a cylindrical tube that encircles and is centered on the mandrel longitudinal axis 53. An inner end 36 of the body portion 31 (e.g., an end of the body portion 31 facing the mandrel 50) defines an annular planar surface that abuts the mandrel intermediate portion 56. The body portion 31 includes a pair of diametrically-opposed through openings 38 that are shaped and dimensioned to receive the pin 78 in a press-fit. When the guide 30 is assembled with the mandrel 50, the mandrel head portion 54 is received inside the guide body portion 31. In addition, the pin 78 is disposed in the mandrel through-opening 58 and opposed ends of the pin 78 are received in the body portion through-openings 38, whereby the pin 78 secures the guide 30 to the mandrel first end 51.

The guide 30 includes a pair of posts 32 that protrude from an outer end 35 of the body portion 31 (e.g., an end of the body portion 31 that faces away from the mandrel 50) in a direction parallel to the mandrel longitudinal axis 53. The body portion outer end 35 is opposite the inner end 36. The posts 32 are disposed on diametrically-opposed sides of the body portion 31, and have an axial dimension sufficient for the posts 32 to extend through an opening 18 in an end 11 of the collar 10. In the illustrated embodiment, an axial dimension of each post 32 is approximately the same as the axial dimension of the body portion 31.

An outer surface of each post 32 includes a guide slot 34. Each guide slot 34 is configured to receive a guide tooth 28 of the collar 10 in a sliding fit. By this configuration, the motion of the collar 10 relative to the guide 30, and thus relative to the mandrel 50, is determined by the shape of the guide slots 34. Each guide slot 34 includes an axially-extending portion 34(1) and a circumferentially extending portion 34(2) arranged in a T-shape. In particular, the axially-extending portion 34(1) opens at a free end 39 of each post 32 and terminates by intersecting the circumferentially-extending portion 34(2) in the vicinity of the body portion outer end 35.

The T-shape of the guide slots 34 permit relative axial movement of the collar 10 and the mandrel 50 when the guide teeth 28 are rotationally aligned with the axially-extending portion 34(1) of the guide slot 34. However, if the collar 10 is rotated slightly relative to the mandrel 50 when the guide teeth 28 are in the circumferentially-extending portion 34(2) such that the guide teeth 28 are not axially aligned with the axially-extending portion 34(1), relative axial motion of the collar 10 relative to the mandrel 50 is prevented.

The guide 30 includes recesses 33 that are formed in the body portion outer end 35. In particular, a recess 33 is provided midway between each post 32 whereby the recesses 33 are disposed on diametrically-opposed sides of the body portion 31. The recesses 33 are shaped and dimensioned to receive a deflection tooth 25 therethrough, which may occur in certain axial positions of the collar 10 relative to the mandrel 50. For example, in the illustrated embodiment the recesses 33 have a rectangular shape when the collar 10 is viewed in side view.

Figures 10, 11:
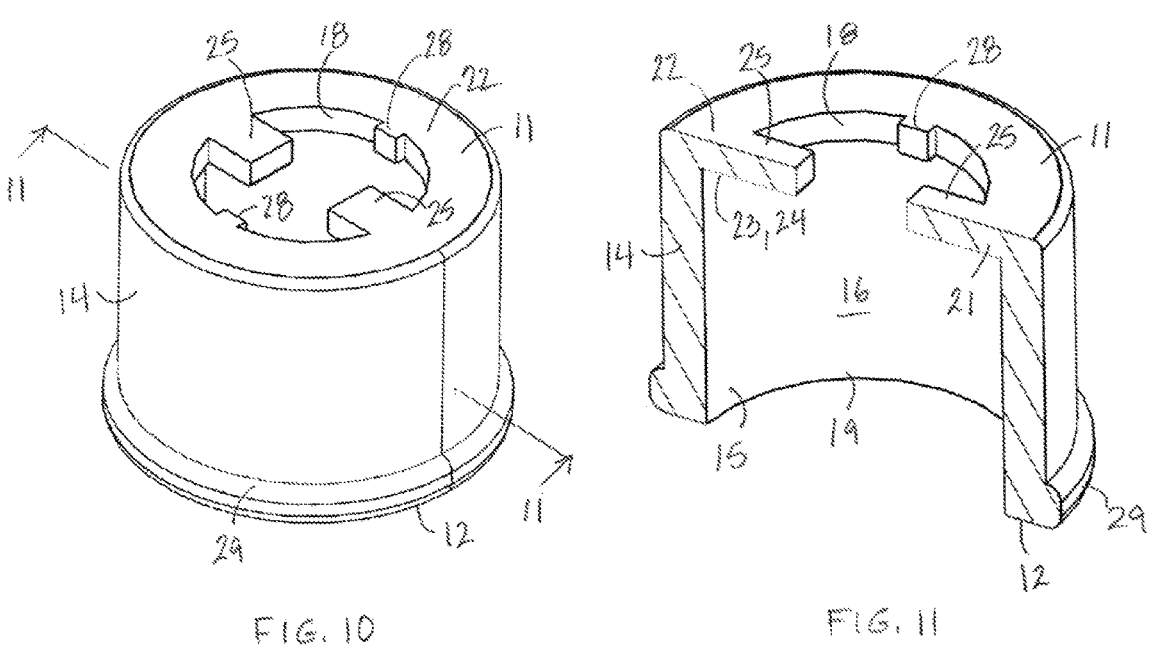
FIG. 10 is a perspective view of the collar.
FIG. 11 is a cross-sectional view of the collar as seen along line 11-11 of FIG. 10.
Figures 12, 13, 14:
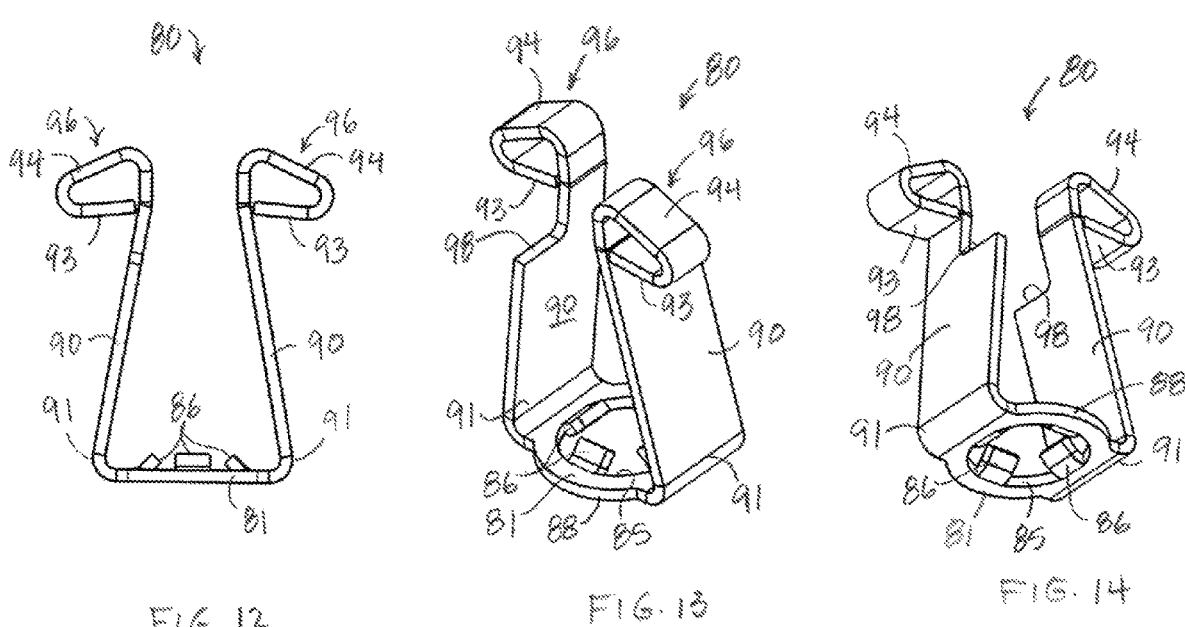
FIG. 12 is a side view of the inner elastic member.
FIG. 13 is a top perspective view of the inner elastic member.
FIG. 14 is a bottom perspective view of the inner elastic member.
Figure 15:
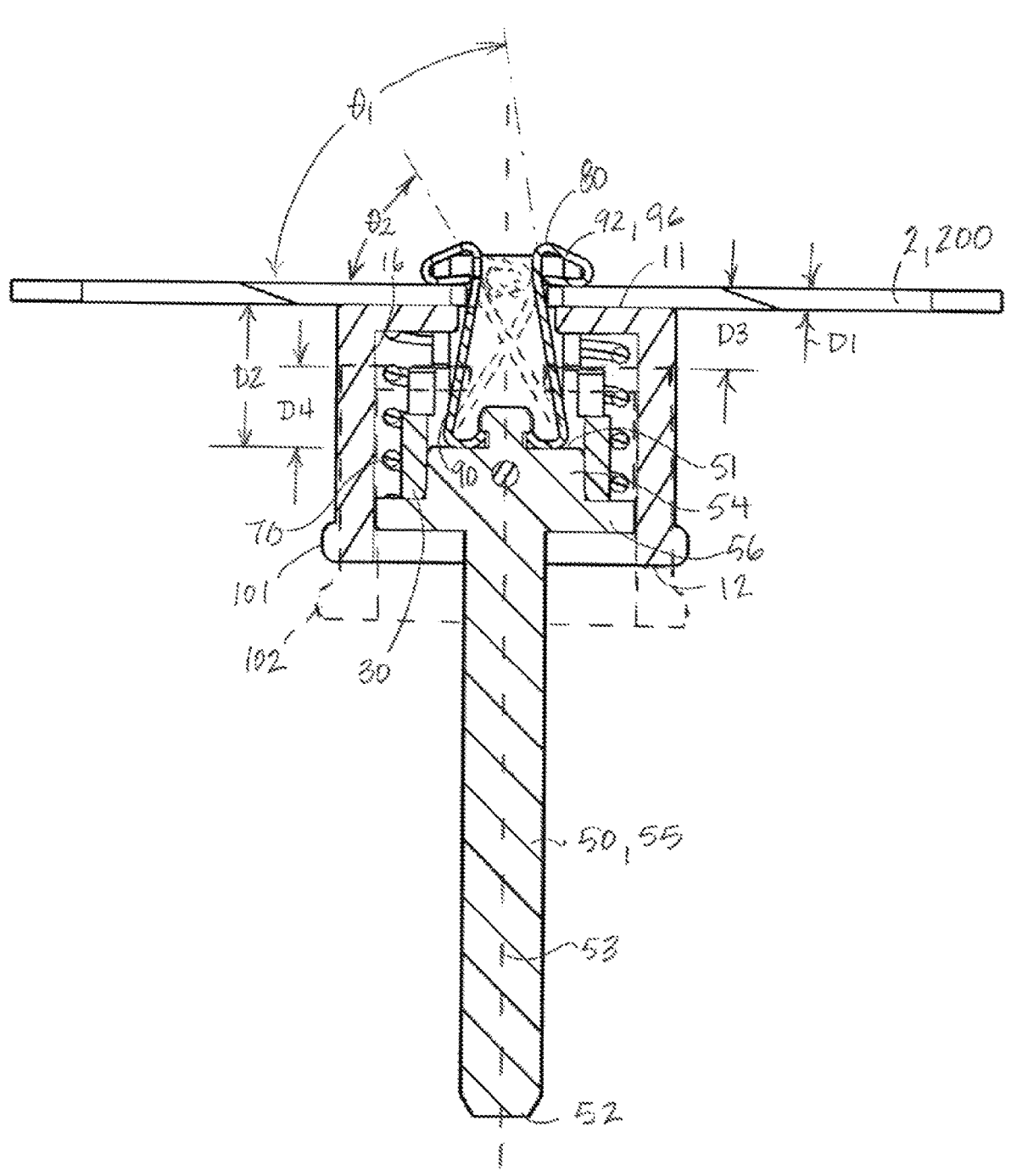
FIG. 15 is a cross-sectional side view of the mandrel assembly as seen along line 15-15 of FIG. 3, showing the accessory attached thereto. In this figure, solid lines represent the mandrel assembly with the collar in the first position and broken lines represent the mandrel assembly with the collar in the second position.
Figure 16:
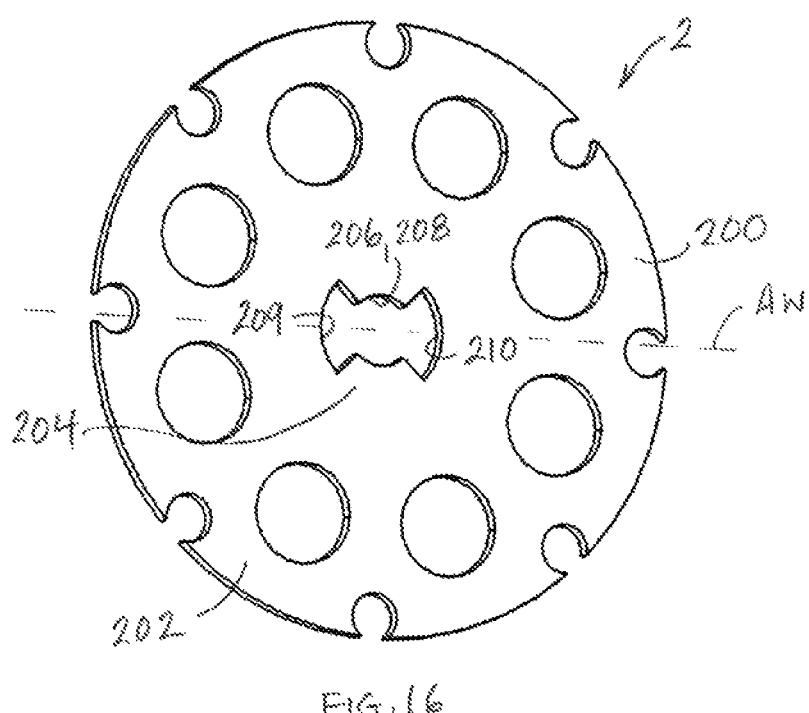
FIG. 16 is a perspective view of the accessory.
Figure 17:
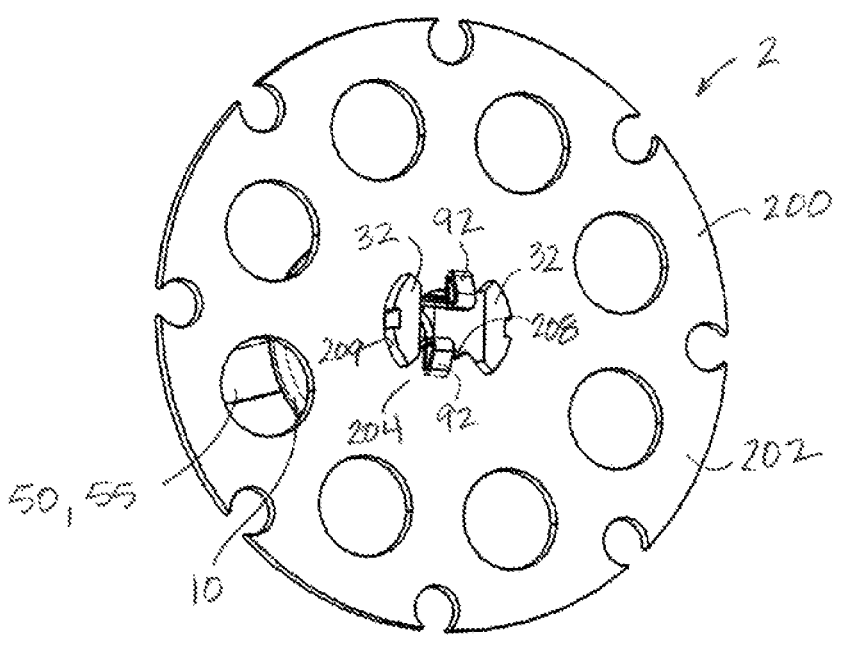
FIG. 17 is a perspective view of the accessory when mounted on the mandrel assembly.

Referring to FIGS. 10 and 11, the collar 10 is a hollow, rigid cylinder that surrounds a portion of the mandrel 50. The collar 10 includes a sidewall 14 that extends between a collar first end 11 and a collar second end 12 that is opposite the collar first end 11. An inner surface 15 of the sidewall 14 defines the bore 16. The bore 16 is centered on the longitudinal axis 53 and has a diameter that is greater than that of an outer surface of the guide 30, whereby an annular gap 13 exists between the sidewall 14 and the guide 30. The gap 13 is dimensioned to receive the outer elastic member 70 therein. In the illustrated embodiment, the elastic member 70 is a coil spring that is positioned around the guide 30, as discussed below.

The collar first end 11 is closed by an end wall 21 that includes a centrally-disposed collar first opening 18 through which the guide 30 and inner elastic member 80 each protrude. The collar first opening 18 is dimensioned to permit the guide 30, and thus also the mandrel 50, to freely axially translate with respect to the collar 10. An outer surface 22 and an inner surface 23 of the end wall 21 are perpendicular to the longitudinal axis 53. The inner surface 23 of the end wall 21 defines a collar inner shoulder 24 that extends between the sidewall inner surface 15 and the collar first opening 18.

The collar first opening 18 includes a pair of diametrically-opposed guide teeth 28 that protrude radially inward toward the mandrel longitudinal axis 53. The guide teeth 28 are shaped and dimensioned to engage with a corresponding guide slot 34 of the guide 30 in a sliding fit. In the illustrated embodiment, the guide teeth 28 each have a rectangular profile when viewed in a direction parallel to the mandrel longitudinal axis 53. In the illustrated embodiment, the mandrel 50 is retained within the collar 10 via engagement between the guide teeth 28 of the collar 10 and the T-shaped guide slots 34 of the guide 30.

The collar first opening 18 includes a pair of diametrically-opposed deflection teeth 25 that protrude radially inward toward the mandrel longitudinal axis 53. The deflection teeth 25 alternate with the guide teeth 28 along the circumference defined by the collar first opening 18.

In the illustrated embodiment, the deflection teeth 25 and the guide teeth 28 are equally spaced from each other along the circumference defined by the first opening 18. In certain axial positions of the collar 10 with respect to the mandrel 50, each deflection tooth 25 is configured to engage a corresponding spring arm 90 of the inner elastic member 80. In the illustrated embodiment, the deflection teeth 25 each have a rectangular profile when viewed in a direction parallel to the mandrel longitudinal axis 53. In addition, the deflection teeth 25 have radial and width dimensions that are greater than those of the guide teeth 28.

The collar second end 12 is open, and the intersection of the bore 16 with the collar second end defines a collar second opening 19. The mandrel shank portion 55 extends through the collar second opening 19. The collar second end 12 includes an enlarged rim 29 that protrudes radially outward and extends around the circumference of the sidewall 14. The enlarged rim 29 provides a gripping surface that is useful to assist a user in manually gripping the collar 10 and urging the collar 10 to translate axially relative to the mandrel 50, as discussed further below.

Referring to FIGS. 4 and 5, the mandrel assembly 4 includes an outer elastic member 70, for example a coil spring, that is disposed in the gap 13 between the collar 10 and the mandrel 50. The coil spring 70 is coaxial with, and surrounds, the guide 30, which in turn surrounds the mandrel head portion 54. A first end 71 of the spring 70 abuts the collar inner shoulder 24, and the opposite, second end 72 of the spring 70 abuts the mandrel intermediate portion 56. The spring 70 is dimensioned to be under compression in the mandrel assembly 4 so that the spring 70 biases the collar 10 away from the mandrel second end 52.

Referring to FIGS. 4-5 and 12-15, the mandrel assembly 4 includes an inner elastic member 80 that is disposed on the mandrel first end 51. The inner elastic member 80 is a generally U-shaped element that may be formed of, for example, a narrow strip of spring steel that has been stamped and bent into the illustrated shape. In particular, the inner elastic member 80 includes a base 81 and a pair of spring arms 90 that protrude from the base 81.

The base 81 is a flat annulus having an outer diameter than is equal to or less than the diameter d1 of the mandrel head portion 54 and an inner diameter that is greater than that of the protrusion 60. An inner periphery 85 of the base 81 includes circumferentially spaced teeth 86. The teeth 86 are angled such that the radially innermost edges of the teeth 83 are non-coplanar with respect to the base 81. As a result, the teeth 86 engage the protrusion 60 so as to fix the inner elastic member 80 relative to the mandrel 50. In the illustrated embodiment, the teeth 86 engage with the neck 61 of the protrusion 60 whereby the axial location of the inner elastic member 80 relative to the mandrel 50 is secured. By this configuration, the base 81 is disposed between the posts 32 of the guide 30.

The spring arms 90 protrude from an outer periphery 88 of the base 81 in a direction away from the mandrel 50 and in the same direction as the teeth 86. Each of the spring arms 90 include a proximal end 91 that is fixed to the base outer periphery 88, and a distal end 92 that is opposite the proximal end 91 and spaced apart from the base 81 and the mandrel 50. The proximal ends 91 of the spring arms 90 are disposed on diametrically opposed sides of the base 81. The proximal ends 91 are spaced apart a distance corresponding to a diameter of the base 81.

The distal end 92 of each spring arm 90 is shaped and dimensioned to provide a clamping jaw 96 that is used to clamp the accessory 2 to the collar first end 11. In particular, each spring arm distal end 92 has a triangular profile that includes a clamping surface 93 and a cam surface 94. The clamping surface 93 is planar and extends in a direction perpendicular to the mandrel longitudinal axis 53. By this configuration, the clamping surface 93 faces the collar end wall outer surface 22. The cam surface 94 is angled relative to the clamping surface 93 and the mandrel longitudinal axis 53. In addition, the cam surface 94 faces away from the clamping surface 93.

The spring arms 90 extend through the collar first opening 18 such that the distal ends 92 are disposed outside the collar bore 16. When under no load, the spring arms 90 are at a first angle θ1 relative to base 81. In the illustrated embodiment, the first angle θ1 is in a range of 65 degrees to 85 degrees. By this configuration, the distal ends 92 are disposed on opposed sides of the mandrel longitudinal axis 53 and the spacing between the respective distal ends 92 is smaller than the spacing between the respective proximal ends 91.

Material has been removed from a lateral side of each clamping jaw 96 whereby a width of each distal end 92 is less than a width of the corresponding proximal end 91. This region of each clamping jaw 96 is referred to as a "cut out" 98.

The spring arms 90 are configured to elastically deflect relative to the base 81 in a direction perpendicular to the mandrel longitudinal axis 53. For example, for certain axial positions of the collar 10 relative to the mandrel 50, each spring arm 90 may be deflected away from the no-load configuration due to force applied by a respective deflection tooth 25 of the collar 10, as discussed in detail below. The deflection of the spring arms 90 by the collar 10 results in a reduction of the relative angle between the respective spring arms 90 and the base 81, whereby the distal ends 92 move toward each other. Upon sufficient deflection, the distal end 92 of each spring arm 90 is received in the cut out 98 of the other spring arm 90 such that, when viewed from the side (FIG. 15), the clamping jaws 96 are aligned with the mandrel longitudinal axis 53 and the spring arms 90 are crossed in an X configuration.

Referring to FIGS. 3 and 15-17, the mandrel assembly 4 is operable to attach or detach an accessory 2 quickly and easily to or from the rotary tool 1. The accessory 2, for example a cut off wheel 200, is secured to the collar first end 11 via a clamping action of the mandrel assembly 4. The cut-off wheel 200 includes a rigid hub 204 and a rigid disc portion 202 that surrounds the hub 204. The disc portion 202 defines an outer perimeter of the accessory 2, which in this embodiment provides a cutting surface. A centrally-located hub opening 206 is formed in the hub 204.

In the illustrated embodiment, the hub opening 206 defines a circular central cut out 208, a first cut out 209 disposed on one side of the central cut out 208 and a second cut out 210 disposed on a side of the central cut out 208 opposite the first cut out 209. The first cut out 209 and the second cut out 210 each have the shape of a circular sector whereby the hub opening 206 has the appearance of a bow tie when the accessory 2 is viewed in top plan view. The first and second cut outs 209, 210 are aligned along a wheel axis Aw that is colinear with a diameter of the wheel 200.

The central cut out 208 of the hub opening 206 has a diameter that accommodates insertion of the spring arm distal ends 92 therethrough when the inner elastic member 80 is radially compressed by movement of the collar 10 relative to the mandrel 50, as discussed further below. The hub opening 206 has a maximum diameter along the wheel axis Aw, and the maximum diameter of the hub opening 206 is set to receive the posts 32 of the guide 30 in a tolerance fit. By this configuration, when the cut off wheel 200 is assembled with the mandrel assembly 4, the guide posts 32 protrude through the respective first and second cut outs 209, 210, and the curved shaped and dimensions of the first and second cut outs 209, 210 corresponds to that of the periphery of the guide posts 32.

In some embodiments, the cut-off wheel 200 is formed by molding the disc portion 202 from a combination of materials that include abrasive materials, resin materials, and one or more fiberglass mesh segments. Such a molding process is well-known in the art of manufacturing cut-off wheels.

The clamping jaws 96 of the spring arms 90 are used to clamp the accessory 2 to the collar first end 11. In operation, the spring arms 90 are deflected to permit the accessory 2 to be mounted on or removed from the mandrel assembly 4. The amount of deflection of the spring arms 90 is determined by an axial position of the collar 10 relative to the mandrel 50. In particular, the configuration of the spring arms 90 may be changed by moving the collar 10 axially relative to the mandrel 50, and the amount of deflection of the spring arms 90 is determined by the axial position of the collar relative to the mandrel 50.

During operation of the mandrel assembly 4 to attach or detach an accessory 2 to or from the rotary tool 1, the collar 10 is moved relative to the mandrel 50 between a first position 101 (shown in solid lines in FIG. 16) and a second position 102 (shown in broken lines in FIG. 16) that is axially offset with respect to the first position 101.

When the collar 10 is in the first position 101, the collar first end 11 is spaced maximally spaced apart from the mandrel first end 51 to the extent allowed by travel of the collar guide teeth 28 within the guide slot axial portion

34(1). The clamping surfaces 93 of each clamping jaw 96 are separated from the collar first end 11 by a first axial distance D1. When no accessory 2 is mounted on the mandrel assembly 4, the first axial distance D1 is zero. When an accessory 2 is mounted on the mandrel assembly 4, the first axial distance D1 corresponds to the thickness of the accessory 2. In addition, when the collar 10 is in the first position 101, the collar first end 11 is separated from the mandrel first end 51 by a second axial distance D2.

When the collar 10 is in the first position 101, the deflection teeth 25 of the collar 10 are not in contact with the spring arms 90 and the spring arms 90 are in an unloaded configuration. In the unloaded configuration, the spring arms 90 are at the first angle θ1 relative to base 81 and the distal ends 92 of the spring arms 90 are spaced apart from the mandrel longitudinal axis when the mandrel assembly is seen in side view.

As the collar 10 is moved axially out of the first position 101 and toward the second position 102, the collar 10 moves closer to the mandrel second end 52. In addition, each of the deflection teeth 25 contacts a corresponding one of the spring arms 90. If the collar 10 is moved further axially toward the mandrel second end 52, the deflection teeth 25 apply a biasing force in a direction perpendicular to the mandrel longitudinal axis 53, causing the respective spring arms 90 to deflect from the first angle θ1 to an angle that is less than the first angle θ1.

When the collar 10 is in the second position 102, the collar first end 11 is closer to the mandrel first end 51 as compared to the first position 101. The clamping surfaces 93 of each clamping jaw 96 are separated from the collar first end 11 by a third axial distance D3, where the third axial distance D3 is greater than the first axial distance D1. In addition, when the collar 10 is in the second position 102, the collar first end 11 is separated from the mandrel first end 51 by a fourth axial distance D4, where the fourth axial distance is less than the second axial distance D2.

When the collar 10 is in the second position 102, the deflection teeth 25 of the collar 10 are in contact with the spring arms 90 and the spring arms 90 are in a loaded configuration. More specifically, the deflection teeth 25 of the collar 10 deflect the spring arms 90 to a second angle θ2 that is less than the first angle θ1. In the illustrated embodiment, the second angle θ2 is in a range of 40 degrees to 50 degrees. In this configuration, the distal end 92 of each spring arm 90 is received in the cut out 98 of the other spring arm 90 such that, when viewed from the side, the clamping jaws 96 are aligned with the mandrel longitudinal axis 53 and the spring arms 90 are crossed in the X configuration.

In order to mount an accessory 2 on the mandrel assembly 4, the collar 10 is moved to the second position 102. In this position, the collar 10 is moved away from the clamping jaws 96, and the clamping jaws 96 are in a minimally-spaced configuration that permits insertion of the clamping jaws 96 through the central cut out 208 of the hub opening 206 of the accessory 2. As the clamping jaws 96 are inserted into the central cut out 208, the guide posts 32 of the guide are inserted into the first and second cut outs 209, 210 of the hub opening 206 of the accessory 2. Rotational motion of the accessory 2 relative to the guide 30 is prevented due to the complimentary shape and dimensions of the posts 32 and the first and second cut outs 209, 210. The accessory 2 is positioned against the collar first end 11, and the collar 10 is permitted to move axially from the second position 102 to the first position 101 under the biasing force of the outer elastic member (e.g., the coil spring) 70. When the collar 10 is moved in the reverse direction, e.g., axially toward the mandrel first end 51, to an extent that the deflection teeth 25 no longer engage the spring arms 90, the spring arms 90 elastically return to the configuration shown in solid lines in FIG. 16, in which the spring arms 90 are oriented at the first angle θ1 relative to the base 81. In addition, the biasing force of the outer elastic member 70 forces the collar 10 toward the clamping jaws 96 such that the hub portion 204 of the accessory 2 is clamped between the clamping surfaces 93 of the clamping jaws 96 and the collar first end 11.

In order to detach an accessory 2 from the mandrel assembly 4, the collar 10 is moved from the first position 101 to the second position 102, whereby the accessory 2 is released from the clamped arrangement and can easily be removed from the mandrel assembly 4.

As described above, a mandrel assembly 4 is disclosed that allows an accessory 2 to be quickly and conveniently coupled to the mandrel assembly 4 without the need for an additional tool such as a screw driver. Likewise, by repeating the above-described actions, the accessory 2 may be quickly and conveniently decoupled from the mandrel assembly 4. Therefore, the mandrel assembly 4 may be conveniently used to connect numerous interchangeable accessories such as cut-off wheels, polishing wheels, grinding wheels, sanding discs, or similar articles of manufacture to the rotary tool 1.

In the illustrated embodiment, both the mandrel 50 and the collar 10 are formed of metal such as steel. However, depending on the requirements of the specific application, the mandrel 50 may be formed of a different material than the collar 10. In some embodiments, the mandrel 50 and/or the collar 10 may be formed of alternative materials such as high strength polymers as determined by the requirements of the application.

Selective illustrative embodiments of mandrel assembly for a power tool are described above in some detail. It should be understood that only structures considered necessary for clarifying the mandrel assembly have been described herein. Other conventional structures, and those of ancillary and auxiliary components of the mandrel assembly, power tool and accessory are assumed to be known and understood by those skilled in the art. Moreover, while working examples of the mandrel assembly have been described above, the mandrel assemblies are not limited to the working examples described above, but various design alterations may be carried out without departing from the device as set forth in the claims.

What is claimed is:

1. A mandrel assembly, comprising:
a cylindrical collar including
a collar first end,
a collar second end that is opposite the first end, and
a sidewall that extends between the collar first end and the collar second end, the sidewall including an inner surface that defines a bore, the intersection of the bore with the collar first end defining a first collar opening, the intersection of the bore with the collar second end defining a second collar opening, the bore having a step change in diameter that defines a collar inner shoulder;
a mandrel including
a mandrel first end that is disposed in the bore,
a mandrel second end that is opposite the mandrel first end, the mandrel second end protruding from the collar second end, and
a mandrel longitudinal axis that extends through the mandrel first end and the mandrel second end;
a guide including a body portion that is disposed in the bore and secured to the mandrel first end, and
a first post and a second post that protrude from the body portion in a direction parallel to the mandrel longitudinal axis, the first post being disposed on a side of the mandrel longitudinal axis that is diametrically opposed to the second post;
an outer elastic member that extends from the mandrel first end to the collar inner shoulder and biases the collar first end away from the mandrel second end; and
an inner elastic member that includes
a base that is disposed between the first post and the second post and is fixed to the mandrel first end, and
a spring arm that protrudes from the base and extends through the first collar opening, the spring arm configured to elastically deflect relative to the base in a direction perpendicular to the mandrel longitudinal axis.

2. The mandrel assembly of claim 1, wherein
the spring arm is configured to elastically deflect between a first position and a second position, and
the second position is closer to the mandrel longitudinal axis than the first position.

3. The mandrel assembly of claim 1, wherein an amount of deflection of the spring arm is determined by an axial position of the collar relative to the mandrel.

4. The mandrel assembly of claim 1, wherein
the spring arm includes a proximal end that adjoins the base and distal end that is opposite the proximal end, and
the distal end is shaped and dimensioned to provide a clamping jaw.

5. The mandrel assembly of claim 1, wherein
the base of the inner elastic member includes
a first surface that faces the mandrel,
a second surface that faces away from the mandrel,
a central opening that extends between the first surface and the second surface and defines an inner peripheral surface, and
teeth that protrude inward from the inner peripheral surface and are acutely angled relative to the second surface.

6. The mandrel assembly of claim 5, wherein the teeth are configured to engage a protrusion of the mandrel.

7. The mandrel assembly of claim 5, wherein the spring arm protrudes from the second surface so as to be acutely angled relative to the second surface.

8. The mandrel assembly of claim 1, wherein
the base comprises a central opening configured to engage a portion of the mandrel.

9. The mandrel assembly of claim 1, wherein
when the collar is in a first axial position relative to the mandrel, the spring arm is at a first angle relative to the base, and the distance between the collar first end and the mandrel first end is a first axial distance,
when the collar is in a second axial position relative to the mandrel, the spring arm is at a second angle relative to the base, and the distance between the collar first end and the mandrel first end is a second axial distance,
the second angle is less than the first angle, and
the second axial distance is less than the first axial distance.

10. The mandrel assembly of claim 1, wherein
the spring arm comprises a first spring arm and a second spring arm, the first spring arm and the second spring arm each include a proximal end that is fixed to the base and a distal end that is spaced apart from the proximal end, and the distal end of each of the first spring arm and the second spring arm has a triangular profile that defines a cam surface and a clamping surface that is angled relative to the cam surface.

11. The mandrel assembly of claim 10, wherein the cam surface of the first spring arm faces away from the cam surface of the second spring arm.

12. The mandrel assembly of claim 10, wherein the clamping surfaces of the first spring arm and the second spring arm face an outer surface of the collar.

13. The mandrel assembly of claim 1, wherein the spring arm comprises a first spring arm and a second spring arm, the first spring arm and the second spring arm each include a proximal end that is fixed to the base and a distal end that is spaced apart from the proximal end, the proximal end of the first spring an is spaced apart from the proximal end of the second spring arm, and the first spring arm and the second spring arm each protrude from the base at a first angle such that distance between the respective distal ends of the first and second spring arms is smaller than the distance between the respective proximal ends of the first and second spring arms when the inner elastic member is in an unloaded state.

14. The mandrel assembly of claim 13, wherein when the collar is in a first axial position relative to the mandrel, the first spring arm and the second spring arm are at the first angle relative to the base, and the distance between the collar first end and the mandrel first end is a first axial distance, when the collar is in a second axial position relative to the mandrel, a protrusion of the collar engages the first spring arm and the second spring arm and causes the first spring arm and the second spring arm to deflect such that the first spring arm and the second spring arm are at a second angle relative to the base, and the distance between the collar first end and the mandrel first end is a second axial distance, the second angle is less than the first angle, and the second axial distance is less than the first axial distance.

15. The mandrel assembly of claim 1, wherein the first collar opening comprises a guide tooth that protrudes radially with respect to the mandrel longitudinal axis, an outer surface of the post comprises an axially-extending guide slot, and the guide tooth is disposed in the guide slot, the guide tooth being shaped and dimensioned to be received in the guide slot in a sliding fit.

16. The mandrel assembly of claim 1, wherein the first collar opening comprises a deflection tooth that protrudes radially with respect to the mandrel longitudinal axis, the deflection tooth configured to engage the spring arm in certain axial positions of the collar with respect to the mandrel.

17. The mandrel assembly of claim 1, wherein the first collar opening comprises a guide tooth that protrudes radially with respect to the mandrel longitudinal axis, the guide tooth configured to engage with a guide slot of the guide, and the first collar opening comprises a pair of deflection teeth that protrude radially with respect to the mandrel longitudinal axis, the guide tooth being disposed between, and spaced apart from, each of the deflection teeth along a circumference of the first collar opening.

18. The mandrel assembly of claim 17, wherein a radial dimension of the guide tooth is different than a radial dimension of each of the pair of deflection teeth.

19. The mandrel assembly of claim 1, wherein the spring arm comprises a first spring arm and a second spring arm, the first spring arm and the second spring arm each include a proximal end that is fixed to the base and a distal end that is spaced apart from the proximal end, when the collar is in a first axial position relative to the mandrel, the first spring arm and the second spring arm are at a first angle relative to the base, when the collar is in a second axial position relative to the mandrel, the first spring arm and the second spring arm are at a second angle relative to the base, and the second angle is less than the first angle.

20. The mandrel assembly of claim 19, wherein the first collar opening comprises a first deflection tooth and a second deflection tooth that protrude radially with respect to the mandrel longitudinal axis and are disposed on opposed sides of the mandrel longitudinal axis, when the collar is in the first axial position relative to the mandrel, the first deflection tooth is not engaged with the first spring arm and the second deflection tooth is not engaged with the second spring arm, and when the collar is in the second axial position relative to the mandrel, the first deflection tooth abuts and deflects the first spring arm and the second deflection tooth abuts and deflects the second spring arm whereby the first spring arm and the second spring arm are at the second angle relative to the base.

* * * * *